United States Patent
Mandal et al.

(10) Patent No.: US 10,042,619 B2
(45) Date of Patent: Aug. 7, 2018

(54) SYSTEM AND METHOD FOR EFFICIENTLY MANAGING ENTERPRISE ARCHITECTURE USING RESOURCE DESCRIPTION FRAMEWORK

(71) Applicant: Cognizant Technology Solutions India Pvt. Ltd., Chennai (IN)

(72) Inventors: Kamales Mandal, Kolkata (IN); Tapodhan Sen, Kolkata (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 169 days.

(21) Appl. No.: 14/960,701

(22) Filed: Dec. 7, 2015

(65) Prior Publication Data

US 2017/0060542 A1    Mar. 2, 2017

(30) Foreign Application Priority Data

Aug. 25, 2015    (IN) ............................. 4451/CHE/2015

(51) Int. Cl.
*G06F 9/44* (2018.01)
*G06F 8/35* (2018.01)
(Continued)

(52) U.S. Cl.
CPC .............. *G06F 8/35* (2013.01); *G06F 8/315* (2013.01); *G06F 8/38* (2013.01); *G06F 9/4428* (2013.01); *G06F 9/4488* (2018.02); *G06F 17/30929* (2013.01)

(58) Field of Classification Search
None
See application file for complete search history.

(56) References Cited

U.S. PATENT DOCUMENTS 7,822,699 B2    10/2010    Katariya
7,933,914 B2     4/2011    Ramsey
(Continued)

FOREIGN PATENT DOCUMENTS

CA       2555280 A1    9/2004

OTHER PUBLICATIONS

Alok Prasad, " How Semantic Web Tech Can Make Big Data Smarter", pp. 1-3, URL: http://www.cmswire.com/cms/featured-articles/how-semantic-web-tech-can-make-big-data-smarter-026726.php#null.

(Continued)

*Primary Examiner* — Li B. Zhen
*Assistant Examiner* — Sen Thong Chen
(74) *Attorney, Agent, or Firm* — Cantor Colburn LLP (57) ABSTRACT

A system, computer-implemented method and computer program product for efficiently managing enterprise architecture using resource description framework is provided. The system comprises a solution configurator configured to facilitate defining one or more Resource Description Framework (RDF)/Extensible Markup Language (XML) models corresponding to one or more applications. The system further comprises an ontology parser configured to parse the one or more defined RDF/XML models to create corresponding Java objects. Furthermore, the system comprises a solution manager configured to process the one or more parsed RDF/XML models for creating the corresponding one or more applications. Also, the system comprises a user interface generator configured to generate one or more graphical user interfaces corresponding to the one or more created applications, wherein the created one or more applications facilitate efficient management of enterprise architecture.

19 Claims, 6 Drawing Sheets

(51) Int. Cl.
  G06F 17/30    (2006.01)
  G06F 8/38     (2018.01)
  G06F 8/30     (2018.01)
  G06F 9/448    (2018.01)

(56) References Cited

U.S. PATENT DOCUMENTS

| | | | |
|---|---|---|---|
| 8,131,668 B2 | 3/2012 | Beringer | |
| 8,566,842 B2 | 10/2013 | Roshen | |
| 8,595,246 B2 | 11/2013 | Fay | |
| 8,666,951 B2 | 3/2014 | Hanis | |
| 8,773,556 B2 | 7/2014 | Yamaguchi | |
| 2003/0158841 A1* | 8/2003 | Britton | G06F 17/30536 |
| 2006/0095309 A1* | 5/2006 | Mangan | G06Q 10/00 717/123 |
| 2006/0217126 A1* | 9/2006 | Sohm | G06Q 10/10 455/454 |
| 2007/0021993 A1* | 1/2007 | Chandra | G06Q 10/06 705/7.12 |
| 2009/0013319 A1* | 1/2009 | Williams | G06F 8/65 717/174 |
| 2009/0063522 A1 | 3/2009 | Fay | |
| 2009/0177777 A1* | 7/2009 | Behrendt | G06F 17/30734 709/226 |
| 2010/0030725 A1* | 2/2010 | Mendis | G06F 21/6227 707/781 |
| 2011/0078675 A1* | 3/2011 | Van Camp | G06F 8/65 717/170 |
| 2013/0095864 A1* | 4/2013 | Marovets | H04W 4/14 455/466 |
| 2014/0143753 A1* | 5/2014 | Chappel | G06F 8/315 717/106 |
| 2014/0156643 A1* | 6/2014 | Rais-Ghasem | G06F 17/30424 707/722 |
| 2015/0243138 A1* | 8/2015 | Arnone | G07F 17/3258 463/25 |
| 2016/0044132 A1* | 2/2016 | Croft | G06Q 10/063112 709/225 |

OTHER PUBLICATIONS

Capabilities Statement, Model Driven Solutions, URL: http://www.modeldriven.com/docsMDSCapabilitiesStatement2012.pdf.
Enterprise Architecture Solutions, Data Access Technologies, URL: http://www.modeldriven.com/enterprizearc.shtml.
Example Semantic Web Applications | Cambridge Semantics, pp. 1-3, URL: http://www.cambridgesemantics.com/semantic-university/example-semantic-web-applications.
IBM Emerging Technologies—jStart—Graduated Technologies—Semantic Enrichment, URL: http://www-01.ibm.com/software/ebusiness/jstart/semantic/.
JiuCheng Xu, "Model Driven Interoperability through Semantic Annotations using SoaML and ODM", URL: http://www.uio.no/studier/emner/matnat/ifi/INF5120/v09/undervisningsmateriale/Model_Driven_Interoperability_through_Semantic_Annotations_using_SoaML_and_O.
Mohamed Keshk, "Model Driven Ontology: A New Methodology for Ontology Development", Raytheon Company, URL: http://ceur-ws.org/Vol-440/paper14.pdf.
Nikolaos Konstantinou, "VisAVis: An Approach to an Intermediate Layer between Ontologies and Relational Database Contents", National Technical University of Athens, Division of Communications, Electronics and , URL: http://ceur-ws.org/Vol-239/paper3.pdf.
Peter Haase, "On Demand Access to Big Data Through Semantic Technologies", fluid Operations AG, URL: https://www.posccaesar.org/svn/pub/SemanticDays/2012/Presentations/May9/04_Peter_Haase.pdf.
Semantic Knowledge Management Framework, Cognitum | Ontorion, pp. 1-6, URL: http://www.cognitum.eu/semantics/Ontorion/.
Semantic-based Corporate Asset Management Example—YouTube, URL: https://www.youtube.com/watch?v=jjmZb8MJ2MQ.
The Essential Project, "Essential Supprt, Getting a helping hand with dedicated, premier support for the Essential Toolset", URL: http://www.enterprise-architecture.org/.
Towards Executable Enterprise Models: Building Semantic Enterprise Architecture Solutions with TopBraid Suite™, TopQuadrant, website www.topquadrant.com, URL: http://www.topquadrant.com/docs/whitepapers/WP-BuildingSemanticEASolutions-withTopBraid.pdf.
Willy Chen, "Semantic Enterprise Architecture Management", URL: http://www.softplant.de/fileadmin/data/publications/SEAM_Paper.pdf.
Xavier Lopez, Oracle, Mining Big Data with RDF Graph Technology:, URL: http://download.oracle.com/otndocs/tech/semantic_web/pdf/semtech_datamining_v8.pdf.

* cited by examiner

SYSTEM AND METHOD FOR EFFICIENTLY MANAGING ENTERPRISE ARCHITECTURE USING RESOURCE DESCRIPTION FRAMEWORK

CROSS REFERENCE TO RELATED APPLICATION

This application is related to and claims the benefit of Indian Patent Application No. 4451/CHE/2015 filed on Aug. 25, 2015, the contents of which are herein incorporated by reference in their entirety.

FIELD OF THE INVENTION

The present invention relates generally to enterprise architecture. More particularly, the present invention provides a system and method for efficiently managing enterprise architecture using resource description framework.

BACKGROUND OF THE INVENTION

Over the last few years, there has been a considerable change in the industry landscape with advent of new services and technologies such as social media, mobile technologies, data analytics and cloud services. Enterprises are becoming more dynamic to keep up with this changing landscape. In order to incorporate new services and technologies, enterprises need to either extend or modify their existing enterprise architecture. The enterprise architecture defines the structure and operations of the enterprise and helps in conducting enterprise analysis, design, planning and implementation for successful development and execution of strategy.

Conventionally, various systems and methods exist for modeling enterprise architecture. For example, some of these systems and methods leverage Extensible Markup Language (XML) and Relational Database Management Systems (RDBMS). However, the abovementioned systems and methods are incapable of capturing information from sources on World Wide Web that comply with semantic web standards. Further, the above-mentioned systems and methods allow limited customization of enterprise architecture model. Furthermore, user interfaces, analytics and other components associated with the enterprise architecture model are not integrated thereby requiring separate alterations to these components which renders the process of customization cumbersome and time consuming. Also, the abovementioned systems and methods are not flexible and it is difficult to extend the enterprise architecture model to incorporate new applications for a dynamic enterprise. For example, it is difficult to extend the enterprise architecture model to incorporate social, mobile, data analytics and cloud services and/or include new partners, vendors and distributors. Further, these existing systems and methods are incapable of customizing the enterprise architecture model to integrate multiple enterprises and one or more services within an enterprise adhering to different standards.

In light of the abovementioned disadvantages, there is a need for an efficient system and method for managing enterprise architecture using resource description framework. Further, there is a need for a web-based system and method that is capable of efficiently extending the enterprise architecture model to incorporate new applications, processes and partners. Furthermore, there is a need for a system and method that is capable of capturing information from sources on the World Wide Web that comply with semantic web standards such as resource description framework. In addition, there is a need for a model-based system and method that allows customizations to the enterprise architecture model along with its associated components without any modifications to user interface layer and application layer. Also, there is a need for a system and method capable of efficiently integrating multiple enterprises and one or more services within an enterprise using semantic web standards.

SUMMARY OF THE INVENTION

A system, computer-implemented method and computer program product for efficiently managing enterprise architecture using resource description framework is provided. The system comprises a solution configurator configured to facilitate defining one or more Resource Description Framework (RDF)/Extensible Markup Language (XML) models corresponding to one or more applications, wherein the one or more RDF/XML models are one or more RDF graph models serialized using XML. The system further comprises an ontology parser configured to parse the one or more defined RDF/XML models to create corresponding Java objects. Furthermore, the system comprises a solution manager configured to process the one or more parsed RDF/XML models for creating the corresponding one or more applications, wherein the one or more applications are created by using the created Java objects to facilitate interaction with one or more enterprise relational databases. Also, the system comprises a user interface generator configured to generate one or more graphical user interfaces corresponding to the one or more created applications, wherein the created one or more applications facilitate efficient management of enterprise architecture.

In an embodiment of the present invention, the one or more RDF/XML models are defined by customizing one or more pre-stored base models and further wherein the one or more pre-stored base models provide one or more templates comprising ontologies required to create the one or more applications. In an embodiment of the present invention, the one or more RDF/XML models are parsed using one or more standard RDF parsers to create the corresponding Java objects.

In an embodiment of the present invention, the one or more applications comprise enterprise situational applications for managing and analyzing enterprise assets. In an embodiment of the present invention, the system further comprises an evaluation module configured to evaluate the one or more created applications based on one or more dimensions. In an embodiment of the present invention, the one or more dimensions for evaluating the one or created applications are configured by one or more administrators. In an embodiment of the present invention, the one or more dimensions comprise technical dimension, financial dimension, functional dimension and strategic dimension.

In an embodiment of the present invention, the system further comprises a reasoning module configured to supplement the one or more defined RDF/XML models with knowledge stored in a knowledge repository, wherein the reasoning module uses at least one of: data integration, natural language processing, text mining, confidence thresholds score based algorithms and statistical models for supplementing the one or more defined RDF/XML models. In an embodiment of the present invention, the system further comprises an analysis module configured to retrieve and manipulate data related to the one or more defined RDF/XML models using a semantic query language to generate one or more reports.

The computer-implemented method for efficiently managing enterprise architecture using resource description framework, via program instructions stored in a memory and executed by a processor, comprises defining one or more Resource Description Framework (RDF)/Extensible Markup Language (XML) models corresponding to one or more applications, wherein the one or more RDF/XML models are one or more RDF graph models serialized using XML. The computer-implemented method further comprises parsing the one or more defined RDF/XML models to create corresponding Java objects. Furthermore, the computer-implemented method comprises processing the one or more parsed RDF/XML models for creating the corresponding one or more applications, wherein the one or more applications are created by using the created Java objects to facilitate interaction with one or more enterprise relational databases. Also, the computer-implemented method comprises generating one or more graphical user interfaces corresponding to the one or more created applications, wherein the created one or more applications facilitate efficient management of enterprise architecture.

The computer program product for efficiently managing enterprise architecture using resource description framework, comprises a non-transitory computer-readable medium having computer-readable program code stored thereon, the computer-readable program code comprising instructions that when executed by a processor, cause the processor to define one or more Resource Description Framework (RDF)/Extensible Markup Language (XML) models corresponding to one or more applications, wherein the one or more RDF/XML models are one or more RDF graph models serialized using XML. The processor further parses the one or more defined RDF/XML models to create corresponding Java objects. Furthermore, the processor processes the one or more parsed RDF/XML models for creating the corresponding one or more applications, wherein the one or more applications are created by using the created Java objects to facilitate interaction with one or more enterprise relational databases. Also, the processor generates one or more graphical user interfaces corresponding to the one or more created applications, wherein the created one or more applications facilitate efficient management of enterprise architecture.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for efficiently managing enterprise architecture using resource description framework is described herein. The invention provides for a web-based system and method that is capable of efficiently extending the enterprise architecture model to incorporate new architecture assets using semantic web standards such as resource description framework. Further, the invention provides for a system and method that is capable of capturing information from sources, on the World Wide Web, that comply with semantic web standards. Furthermore, the invention provides for a model-based system and method that allows customizations to the enterprise architecture model along with its associated components without any modifications to user interface layer and application layer. Also, the invention provides for a system and method capable of efficiently integrating multiple enterprises and one or more services within an enterprise using semantic web standards.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
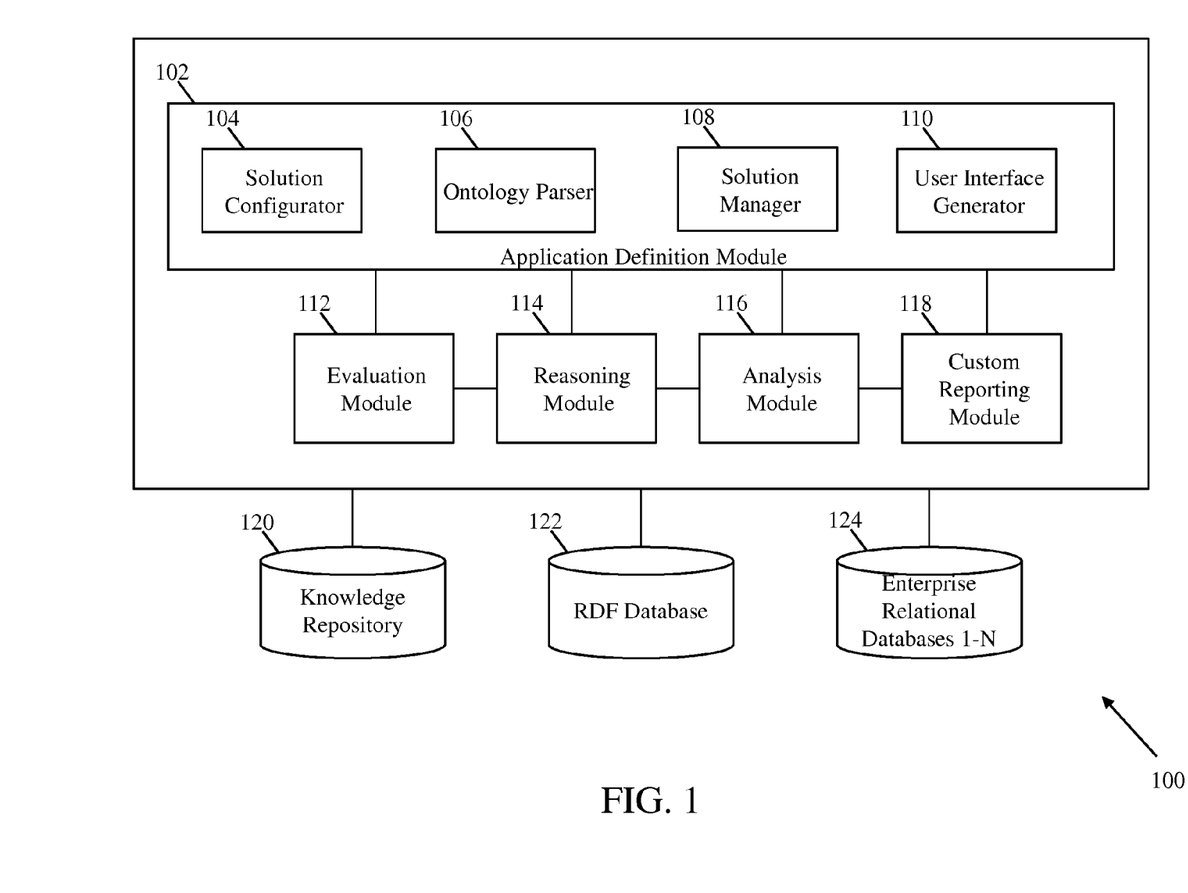
FIG. 1 is a block diagram illustrating a system for efficiently managing enterprise architecture using resource description framework, in accordance with an embodiment of the present invention.

FIG. 1 is a block diagram illustrating a system for efficiently managing enterprise architecture using resource description framework, in accordance with an embodiment of the present invention. The system 100 comprises an application definition module 102, an evaluation module 112, a reasoning module 114, an analysis module 116, a custom reporting module 118, a knowledge repository 120, a Resource Description Framework (RDF) database 122 and one or more enterprise relational databases 124. In an embodiment of the present invention, the system 100 is a web-based system. In an embodiment of the present invention, the system 100 is accessible by one or more administrators via one or more electronic communication devices.

The application definition module 102 is configured to facilitate the one or more administrators to access the system 100 and define one or more applications. The one or more applications facilitate various operations of an enterprise. In an embodiment of the present invention, the one or more applications for an enterprise in banking sector include, but not limited to, Automated Teller Machine (ATM), call tracker, Asset Liability Management (ALM), Anti-Money Laundering (AML) cross fraud, Automatic Call Distribution (ACD) and branch dashboard. In an embodiment of the present invention, the one or more applications include enterprise situational applications for managing and analyzing enterprise assets. Enterprise situational applications serve limited requirements, focus on a specific business problem and are often required to be developed quickly. In an embodiment of the present invention, prior to defining the one or more applications, the one or more administrators understand business requirement and define specific enterprise problem related to enterprise architecture asset management and operation. The one or more administrators then facilitate creating the one or more applications to overcome the defined enterprise problem via the application definition module 102.

The application definition module 102 comprises a solution configurator 104, an ontology parser 106, a solution manager 108 and a user interface generator 110. The solution configurator 104 is a front-end user interface that provides options to the one or more administrators to define one or more RDF/Extensible Markup Language (XML) models corresponding to the one or more applications. In an embodiment of the present invention, the RDF/XML is a syntax defined by World Wide Web Consortium (W3C) to serialize an RDF graph model using XML. Further, the RDF graph model uses RDF specifications which are a set of semantic web standards recommended by W3C. The RDF/XML models conform to the RDF and do not require change or development at user interface layer and application layer during customization of the RDF/XML models.

In an embodiment of the present invention, the solution configurator 104 imports one or more pre-stored base models and their corresponding components and libraries. The one or more pre-stored base models provide various templates comprising ontologies required to model applications that address the specific enterprise problems such as, but not limited to, application portfolio rationalization, process harmonization, global integration and web data capturing. The one or more pre-stored base models are customized by the one or more administrators to define the one or more RDF/XML models corresponding to the one or more applications. The solution configurator 104 also provides options to add custom tabs, custom objects within the custom tabs and grant role-based rights to access the one or more applications and/or the added tabs and objects. Further, the one or more tabs are configured using pre-stored in-built components. In an embodiment of the present invention, the pre-stored base models are capable of integrating with the other base models thereby providing option for integrating the one or more applications.

The ontology parser 106 is configured to parse the one or more defined RDF/XML models corresponding to the one or more applications. In an embodiment of the present invention, ontology parser 106 uses standard RDF parsers for parsing the one or more RDF/XML models. The ontology parser 106 also interprets custom annotations used by the corresponding base model for defining the one or more RDF/XML models. The ontology parser 106 further resolves interdependencies and indirections between the one or more RDF/XML models to create Java object representations of the one or more parsed RDF/XML models.

The solution manager 108 is configured to process the one or more parsed RDF/XML models to facilitate creating the one or more applications. In an embodiment of the present invention, the solution manager 108 communicates with an inference manager to process the one or more pre-stored base models used for defining the one or more RDF/XML models corresponding to the one or more applications. In an embodiment of the present invention, the solution manager 108 uses the created Java object representations of the one or more parsed RDF/XML models to facilitate interaction with the one or more enterprise relational databases 124 and creating the one or more applications. The solution manager 108 also resolves logical associations between various other modules such as, but not limited to, evaluation module 112, reasoning module 114, analysis module 116 and custom reporting module 118 after the one or more applications are created. Further, the solution manager 108 facilitates communication with the user interface generator 110 and manages and controls access to the one or more created applications. Furthermore, the one or more created applications are capable of capturing information from various semantic web sources and integrating with other applications adhering to the semantic web standards.

The user interface generator 110 is configured to generate one or more graphical user interfaces corresponding to the created one or more applications. The user interface generator 110 communicates with the inference manager. The inference manager acts as an Object Relational Mapping (ORM) layer and transforms the one or more defined RDF/XML models to one or more Java object models. The user interface generator 110 then processes the one or more Java object models to generate the one or more graphical user interfaces corresponding to the one or more created applications. In an embodiment of the present invention, the user interface generator 110 resolves the dependencies in the one or more Java object models for creating various user interface elements such as, but not limited to, reference drop downs, date pickers, text boxes, tabs, filtering and validation.

The evaluation module 112 is configured to evaluate and generate one or more score heat maps for the created one or more applications. Further, a score heat map is generated by defining a number range for scoring and then dividing the number range into segments and corresponding color coding. In an embodiment of the present invention, the evaluation module 112 comprises an RDF/XML scoring model that facilitates evaluating the one or more created applications. The evaluation module 112 is discussed in detail in conjunction with FIG. 2.

Figure 2:
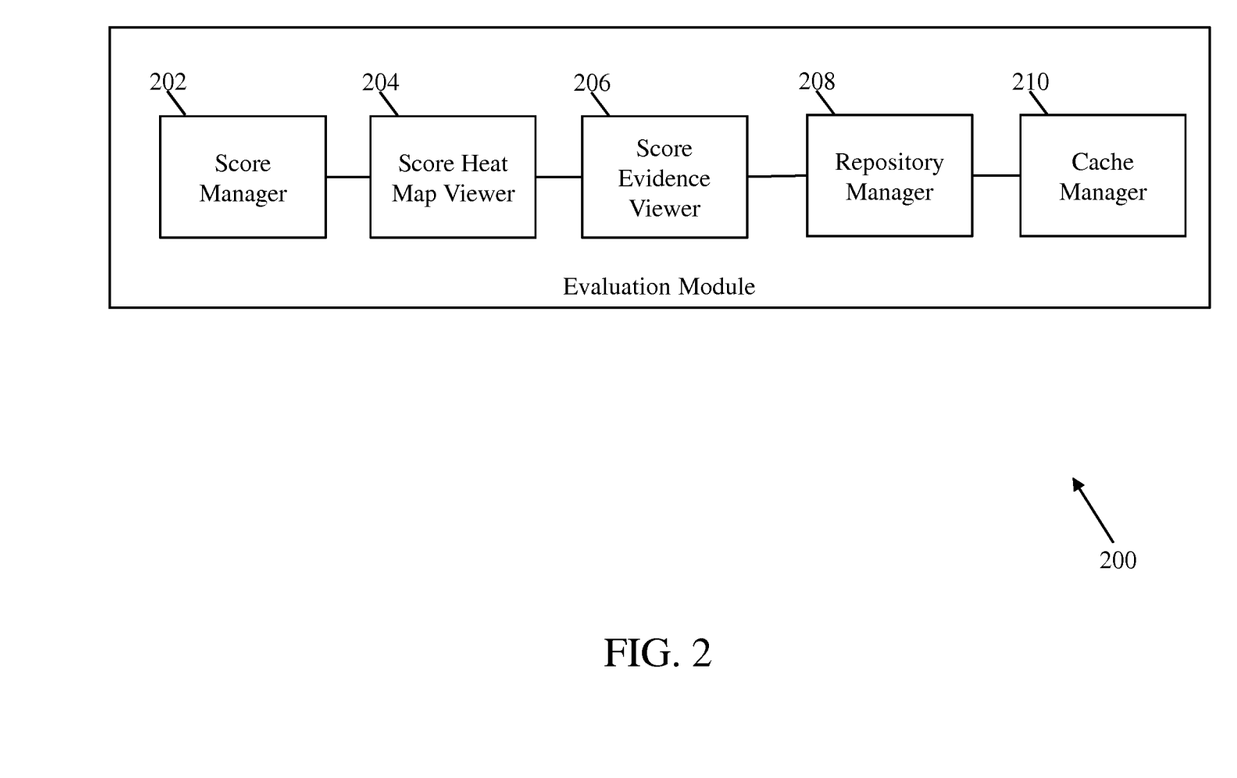
FIG. 2 is a detailed block diagram of an evaluation module, in accordance with an embodiment of the present invention.

FIG. 2 is a detailed block diagram illustrating an evaluation module, in accordance with an embodiment of the present invention. The evaluation module 200 comprises a score manager 202, a score heat map viewer 204, a score evidence viewer 206, a repository manager 208 and a cache manager 210.

The score manager 202 is configured to facilitate the one or more administrators to select an application corresponding to a defined RDF/XML model to be evaluated based on one or more dimensions. In an embodiment of the present invention, the one or more administrators can configure one or more dimensions and one or more attributes corresponding to each dimension for evaluation of the one or more applications via the score manager 202. The one or more dimensions include, but not limited to, technical dimension, financial dimension, functional dimension and strategic dimension. Further, each attribute corresponding to the one or more dimensions is assigned a weight and evaluated. The score manager 202 also provides options to the one or more administrators to select evaluation method of the one or more attributes. In an embodiment of the present invention, the score manager 202 provides various evaluation methods for evaluating the one or more attributes including, but not limited to, manual evaluation, simple automatic evaluation and complex automatic evaluation. In an embodiment of the present invention, each dimension may comprise various attributes that are evaluated using different evaluation methods. In an embodiment of the present invention, if manual evaluation is selected for evaluating an attribute then one or more end-users of the one or more applications are provided options to manually rate the attribute. In an embodiment of the present invention, score manager 202 uses look-up tables and one or more pre-defined rules for evaluation. For example, an attribute such as "appinstances" is evaluated automatically using a pre-defined rule "more app instances are better". Further, the score manager 202 provides a function plugger for adding new functions required for configuring new rules for automatic evaluation. In an embodiment of the present invention, all the attribute weights corresponding to each of the one or more dimensions are normalized to evaluate percentage contribution of each of the one or more dimensions.

The score heat map viewer 204 is configured to use evaluation scores of the one or more applications generated by the score manager 202 to create score heat maps. The score heat map viewer 204 also provides options to the one or more end-users to add and/or remove the one or more dimensions for one or more applications. Further, the score heat map viewer 204 integrates with the score evidence viewer 206 to render details of evaluation.

The score evidence viewer 206 is configured to render details of evaluation on the one or more electronic communication devices. The details of evaluation comprise contribution of each of the one or more attributes corresponding to a dimension to the overall dimension score. The details of evaluation for each dimension are generated and rendered by the score evidence viewer 206 for verification and analysis by the one or more end-users. In an embodiment of the present invention, the details of evaluation are rendered in a tabular form on the one or more electronic communication devices.

The repository manager 208 communicates with ontology parser 106 (FIG. 1) to maintain application model state and acts as a logical abstraction of the knowledge repository 120 (FIG. 1) and RDF database 122 (FIG. 1). Further, the repository manager 208 provides information related to the one or more RDF/XML models to solution manager 108 (FIG. 1), user interface generator 110 (FIG. 1), evaluation module 112 (FIG. 1), reasoning module 114 (FIG. 1), analysis module 116 (FIG. 1) and custom reporting module 118 (FIG. 1). The repository manager 208 is configured to load the one or more RDF/XML models by resolving local/remote import dependencies. The repository manager 208 is a Java based component and is capable of communicating with ordinary file system based ontology database as well as high performance triple stores such as, but not limited to, Jena TripleDataBase (TDB).

The cache manager 210 is configured to store frequently used information and reusable components for improving execution performance. Further, the cache manager 210 acts as a mediatory between in-memory storage and disk storage for quick retrieval of information.

Referring back to FIG. 1, the reasoning module 114 is a predictive analysis component configured to supplement the one or more defined RDF/XML models with pre-defined knowledge stored in the knowledge repository 120. The pre-defined knowledge is stored in the knowledge repository 120 using Semantic Web Rule Language (SWRL). In an exemplary embodiment of the present invention, if the knowledge repository 120 has the following information "application A1 has A2 as inbound interface", then the reasoning module 114 provides supplemental knowledge such as "A2 will have A1 as outbound interface". The reasoning module 114 also uses data integration, text mining and Natural Language Processing (NLP), confidence thresholds score based algorithm and statistical models to supplement the one or more defined RDF/XML models. The reasoning module 114 is discussed in detail in conjunction with FIG. 3.

Figure 3:
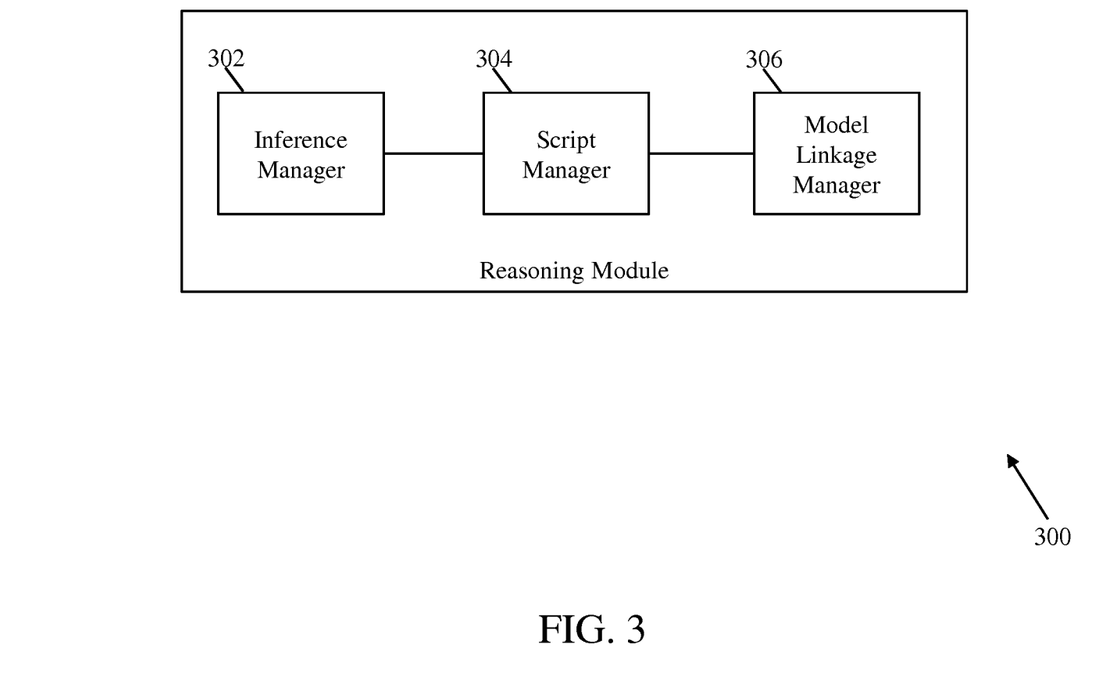
FIG. 3 is a detailed block diagram of a reasoning module, in accordance with an embodiment of the present invention.

FIG. 3 is a detailed block diagram of the reasoning module, in accordance with an embodiment of the present invention. The reasoning module 300 comprises an inference manager 302, a script manager 304 and a model linkage manager 306.

The inference manager 302 acts as an ORM layer for transforming the one or more RDF/XML models into the one or more Java object models for generating the one or more graphical user interfaces corresponding to the one or more created applications. The inference manager 302 also processes semantic indirections and custom annotations present in the one or more defined RDF/XML models and supported by the system 100 to impose restrictions on the one or more applications.

The script manager 304 is configured to enhance the one or more graphical user interfaces generated by the user interface generator 110 (FIG. 1). Further, enhancing the one or more graphical user interfaces facilitates plugging-in additional and complex on screen data validations. Also, the script manager 304 facilitates in applying Java script validations to RDF/XML models.

The model linkage manager 306 is configured to cross-reference and link the one or more defined RDF/XML models. Further, cross-referencing facilitates in integrating the one or more created applications.

Referring back to FIG. 1, the analysis module 116 is configured to facilitate analyzing the one or more created applications by providing collaboration views, audit trail and pivot tables. The analysis module 116 is discussed in detail in conjunction with FIG. 4.

Figure 4:
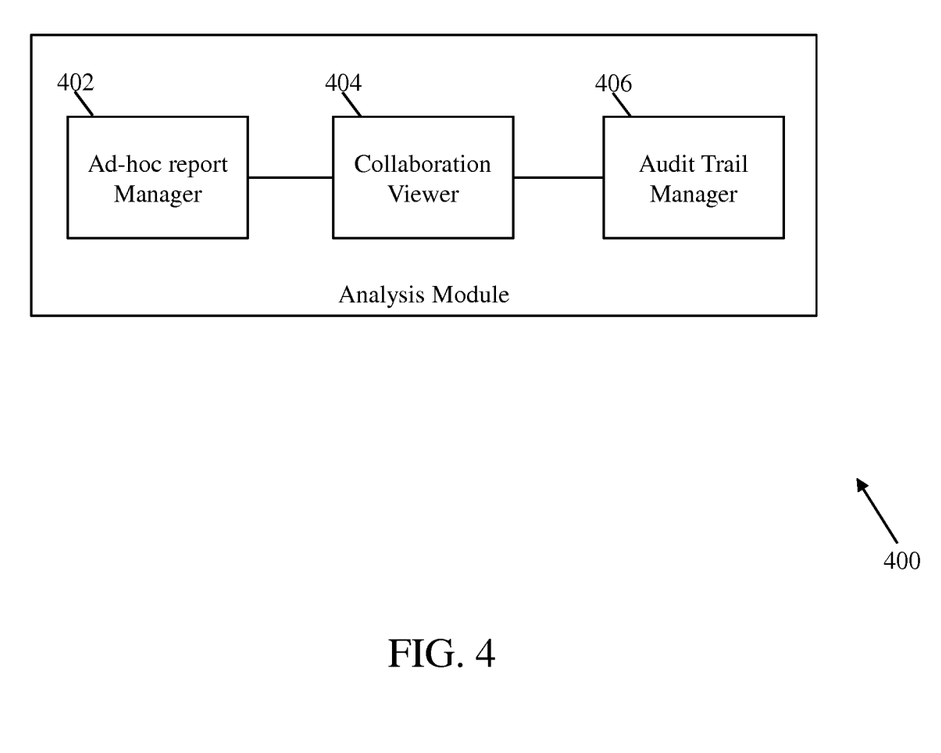
FIG. 4 is detailed block diagram of an analysis module, in accordance with an embodiment of the present invention.

FIG. 4 is a detailed block diagram of the analysis module, in accordance with an embodiment of the present invention. The analysis module 400 comprises an ad-hoc report manager 402, a collaboration viewer 404 and an audit trail manager 406.

The ad-hoc report manager 402 is configured to generate one or more ad-hoc reports related to the one or more created applications. The one or more ad-hoc reports are generated as and when required by the one or more end-users. Further, the one or more ad-hoc reports comprise analysis of data associated with the one or more created applications. The one or more ad-hoc reports are in the form of, but not limited to, pivot tables, charts, maps, diagrams and any other visual graphics. The ad-hoc report manager 402 facilitates configurable and interactive analysis using a semantic query language such as, but not limited to, SPARQL to retrieve and manipulate data related to the one or more RDF/XML models stored in the RDF database 114. The retrieved data is then used by pivot table widget for generating the one or more ad-hoc reports comprising pivot tables. In an embodiment of the present invention, the ad-hoc report manager 402 generates a tree-view based on an RDF/XML model using SPARQL. The ad-hoc report manager 402 then maps data in the generated tree-view to pivot elements to generate the pivot tables. Further, the lineage for the tree-view may be configured by the one or more end-users.

The collaboration viewer 404 is configured to display history of the one or more RDF/XML models and corresponding one or more applications. The history comprises, but not limited to, users' name, modifications and time stamp. Further, the collaboration viewer 404 allows users to view modifications made by other users. In an embodiment of the present invention, one or more users are able to comment on the modifications thereby allowing collaboration amongst the users and for collectively validating the modifications. In an embodiment of the present invention, the collaboration viewer 404 communicates with the audit trail manager 406 to access a log of changes maintained by the audit trail manager 406.

The audit trail manager 406 is configured to maintain the log of changes in the one or more relational databases 124 (FIG. 1). Further, the log comprises details such as, but not limited to, identification of person making the changes, date, time and details of the changes. In an embodiment of the present invention, the audit trail manager 406 displays changes at object and instance level. Further, changes at the object level include changes to types of architecture assets such as, but not limited to, services and processes. Furthermore, changes at the instance level include changes to the enterprise architecture asset. In an exemplary embodiment of the present invention, the audit trail manager 406 uses iBatis as the ORM and is capable of supporting any relational database.

Referring back to FIG. 1, the custom reporting manager 118 is configured to generate one or more customized canned reports associated with the one or more created applications. The one or more customized canned reports are operational reports that are generated using pre-stored and reusable templates. The custom reporting manager 118 supports integration with Business Intelligence and Reporting Tools (BIRT). Further, integration with the BIRT allows generating the one or more customized canned reports by importing one or more BIRT report design files and linking them to SPARQL query results. Furthermore, the custom reporting manager 118 facilitates plugging java components to the system 100 for preparing complex customized canned reports. In an embodiment of the present invention, the customized canned reports are rendered using standard web user interface of the system 100. Further, the custom canned reports along with the evaluation score facilitate the one or more end-users in application portfolio rationalization.

In an embodiment of the present invention, the system 100 also comprises semantic agents capable of accumulating information from the one or more sources on the World Wide Web that comply with semantic web standards. The accumulated information is stored in the knowledge repository 120 by the reasoning module 114. Furthermore, the reasoning module 114 facilitates in providing the stored information to the one or more created applications. The semantic agents are also capable of integrating multiple enterprises and services within an enterprise. Further, integrating multiple enterprises is facilitated by integrating the ontology of the partner enterprise with integration agents. The integration agents are capable of identifying the service required for integration and fetching specific attributes and specific objects associated with the identified service using the ontology of the partner enterprise.

Figure 5:
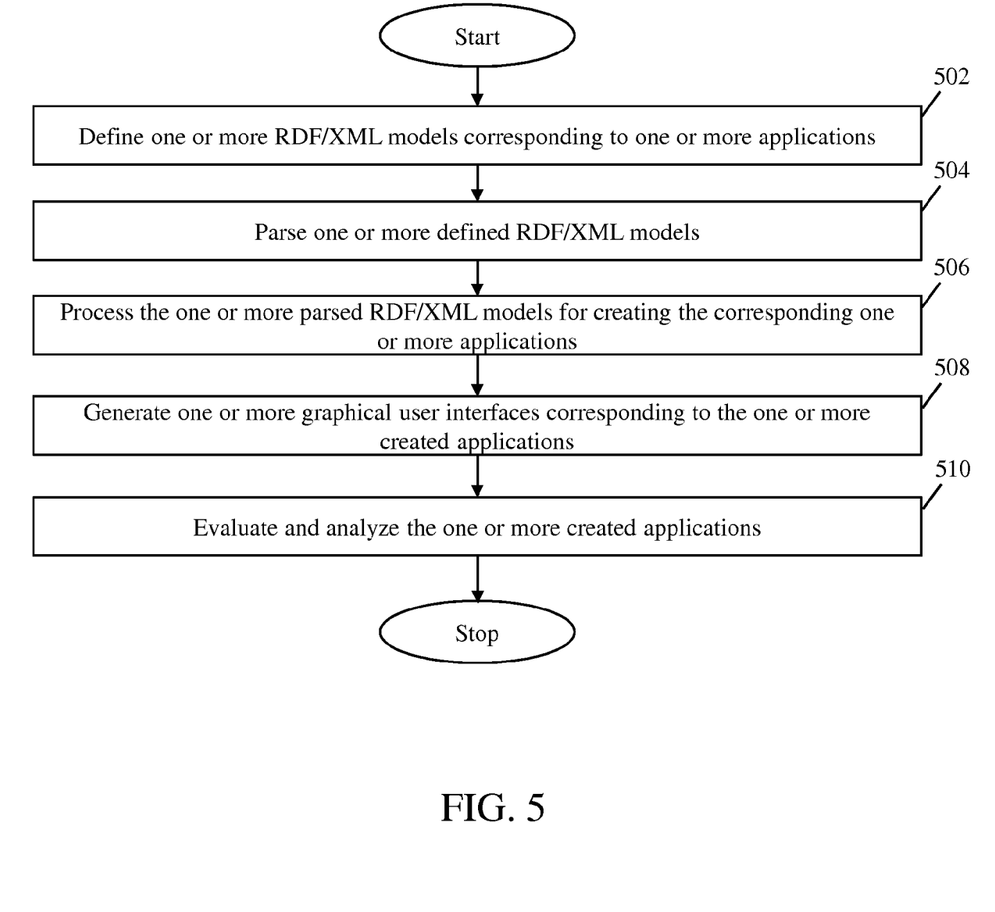
FIG. 5 is a flowchart illustrating a method for efficiently managing enterprise architecture using resource description framework, in accordance with an embodiment of the present invention.

FIG. 5 is a flowchart illustrating a method for efficiently managing enterprise architecture using resource description framework, in accordance with an embodiment of the present invention.

At step 502, one or more Resource Description Framework (RDF)/Extensible Markup Language (XML) models corresponding to one or more applications are defined. The one or more applications facilitate various operations of an enterprise. In an embodiment of the present invention, the one or more applications include enterprise situational applications for managing and analyzing enterprise assets. Enterprise situational applications serve limited requirements, focus on a specific business problem and are often required to be developed quickly. The RDF/XML is a syntax defined by World Wide Web Consortium (W3C) to serialize RDF graph models using XML. Further, the RDF graph models use RDF specifications which are a set of semantic web standards recommended by W3C. The one or more defined RDF/XML models conform to the RDF and do not require change or development at user interface layer and application layer during customization of the RDF/XML models.

In an embodiment of the present invention, prior to defining the one or more applications, the one or more administrators understand business requirement from one or more end-users. The one or more administrators then define specific enterprise problem related to enterprise architecture asset management and operation. Further, the one or more administrators create one or more applications to overcome the defined enterprise problem.

During operation, the one or more administrators import one or more pre-stored base models and their corresponding components and libraries. The one or more pre-stored base models provide one or more templates comprising ontologies required to create the one or more applications. Further, the one or more pre-stored base models are customized by one or more administrators to define the one or more RDF/XML models. The one or more administrators also add custom tabs, custom objects within the custom tabs and grant role-based rights to access the one or more applications and/or the added tabs and objects. Further, the one or more tabs are configured using pre-configured in-built components. In an embodiment of the present invention, the pre-stored base models are capable of integrating with the other base models thereby providing option for integrating the one or more applications.

At step 504, the one or more defined RDF/XML models are parsed. In an embodiment of the present invention, standard RDF parsers are used for parsing the one or more RDF/XML models. Further, interdependencies and indirections between the one or more RDF/XML models are resolved to create corresponding Java object representations of the one or more defined RDF/XML models.

At step 506, the one or more parsed RDF/XML models are processed for creating the corresponding one or more applications. Further, the one or more applications are created by using the created Java objects to facilitate interaction with one or more enterprise relational databases. In an embodiment of the present invention, a pre-stored RDF/XML ontology model facilitates in creating the one or more applications corresponding to the one or more parsed RDF/XML models.

At step 508, one or more graphical user interfaces corresponding to the one or more created applications are generated. During operation, the one or more defined RDF/XML models are transformed to one or more Java object models by an Object Relational Mapping (ORM) layer. The one or more Java object models are then processed to generate the one or more graphical user interfaces corresponding to the one or more created applications.

At step 510, the one or more created applications are evaluated and analyzed based on one or more dimensions. In an embodiment of the present invention, the one or more administrators can configure one or more dimensions and one or more attributes corresponding to each dimension for evaluation of the one or more applications. The one or more dimensions include, but not limited to, technical dimension, financial dimension, functional dimension and strategic dimension. Further, each attribute corresponding to the one or more dimensions is assigned a weight and evaluated. In an embodiment of the present invention, the one or more attributes are evaluated using one or more evaluation methods. The one or more evaluation methods include, but not limited to, manual evaluation, simple automatic evaluation and complex automatic evaluation. In an embodiment of the present invention, all the attribute weights corresponding to each of the one or more dimensions are normalized to evaluate percentage contribution of each of the one or more dimensions.

In an embodiment of the present invention, the one or more created applications are analyzed to provide collaboration views, audit trail and pivot tables. Further, the created one or more applications are supplemented with pre-defined knowledge stored in a knowledge repository. In an embodiment of the present invention, data integration, text mining, Natural Language Processing (NLP), confidence thresholds score based algorithms and statistical models are used to supplement the one or more defined RDF/XML models corresponding to the created one or more applications.

In an embodiment of the present invention, the one or more end-users can access one or more reports related to the one or more created applications, evaluation and analysis. In an embodiment of the present invention, data related to the one or more defined RDF/XML models is retrieved and manipulated using a semantic query language to generate one or more reports. The one or more reports related to the one or more created applications comprise one or more ad-hoc reports and one or more customized canned reports. Further, the one or more ad-hoc reports are generated as and when required by the one or more end-users. In an embodiment of the present invention, the one or more ad-hoc reports comprise analysis of data associated with the one or more created applications. The one or more ad-hoc reports are in the form of, but not limited to, pivot tables, charts, maps, diagrams and any other visual graphics. The one or more customized canned reports are operational reports that are pre-stored and reusable. The custom canned reports, the one or more ad-hoc reports and the evaluation results facilitate the one or more end-users in application portfolio rationalization and making informed business decisions.

Figure 6:
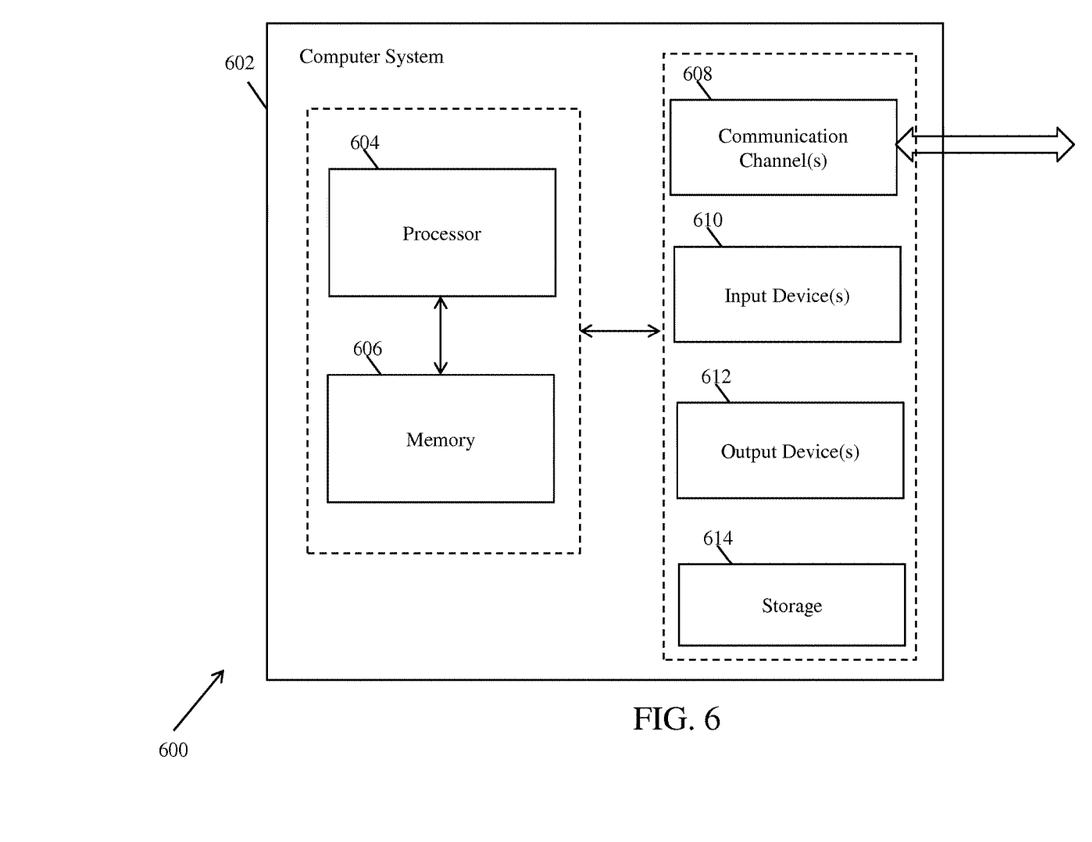
FIG. 6 illustrates an exemplary computer system for efficiently managing enterprise architecture using resource description framework, in accordance with an embodiment of the present invention.

FIG. 6 illustrates an exemplary computer system for efficiently managing enterprise architecture using resource description framework, in accordance with an embodiment of the present invention.

The computer system 602 comprises a processor 604 and a memory 606. The processor 604 executes program instructions and may be a real processor. The processor 604 may also be a virtual processor. The computer system 602 is not intended to suggest any limitation as to scope of use or functionality of described embodiments. For example, the computer system 602 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 606 may store software for implementing various embodiments of the present invention. The computer system 602 may have additional components. For example, the computer system 602 includes one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software (not shown) provides an operating environment for various softwares executing in the computer system 602, and manages different functionalities of the components of the computer system 602.

The communication channel(s) 608 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 610 may include, but not limited to, a keyboard, mouse, pen, joystick, trackball, a voice device, a scanning device, or any another device that is capable of providing input to the computer system 602. In an embodiment of the present invention, the input device(s) 610 may be a sound card or similar device that accepts audio input in analog or digital form. The output device(s) 612 may include, but not limited to, a user interface on CRT or LCD, printer, speaker, CD/DVD writer, or any other device that provides output from the computer system 602.

The storage 614 may include, but not limited to, magnetic disks, magnetic tapes, CD-ROMs, CD-RWs, DVDs, flash drives or any other medium which can be used to store information and can be accessed by the computer system 602. In various embodiments of the present invention, the storage 614 contains program instructions for implementing the described embodiments.

The present invention may suitably be embodied as a computer program product for use with the computer system 602. The method described herein is typically implemented as a computer program product, comprising a set of program instructions which is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer system for efficiently managing enterprise architecture using resource description framework, the computer system comprising a programmed microprocessor and a memory, the computer system further comprising:
    a solution configurator configured to facilitate, using the programmed microprocessor, defining one or more Resource Description Framework (RDF)/Extensible Markup Language (XML) models corresponding to one or more applications, wherein the one or more RDF/XML models are one or more RDF graph models serialized using XML;
    an ontology parser configured to parse, using the programmed microprocessor, the one or more defined RDF/XML models to create corresponding Java objects;
    a solution manager configured to process, using the programmed microprocessor, the one or more parsed RDF/XML models for creating the corresponding one or more applications, wherein the one or more applications are created by using the created Java objects to facilitate interaction with one or more enterprise relational databases;
    a user interface generator configured to generate, using the programmed microprocessor, one or more graphical user interfaces corresponding to the one or more created applications, wherein the created one or more applications facilitate efficient management of enterprise architecture; and
    an evaluation module to evaluate, using the programmed microprocessor, an application from the created one or more applications, wherein the evaluation module is configured to:
    configure one or more dimensions associated with the application;
    configure a first and a second attribute corresponding to each dimension of the one or more dimensions;
    facilitate selection of a first evaluation technique to evaluate the first attribute and a second evaluation technique to evaluate the second attribute, the first evaluation technique is different from the second evaluation technique, wherein the evaluation of the first and the second attribute corresponds to evaluation of the application; and
    generate a score heat map for the application based on the evaluation of the application.

2. The computer system of claim 1, wherein the one or more RDF/XML models are defined by customizing one or more pre-stored base models and further wherein the one or more pre-stored base models provide one or more templates comprising ontologies required to create the one or more applications.

3. The computer system of claim 1, wherein the one or more RDF/XML models are parsed using one or more standard RDF parsers to create the corresponding Java objects.

4. The computer system of claim 1, wherein the one or more applications comprise enterprise situational applications for managing and analyzing enterprise assets.

5. The computer system of claim 1, wherein the evaluation module utilizes one or more evaluation models stored as RDF to evaluate the application from the created one or more applications.

6. The computer system of claim 5, wherein the one or more evaluation models are customized by one or more administrators in real time.

7. The computer system of claim 1, wherein the one or more dimensions comprise technical dimension, financial dimension, functional dimension and strategic dimension.

8. The computer system of claim 1 further comprising a reasoning module configured to supplement, using the programmed microprocessor, the one or more defined RDF/XML models with knowledge stored in a knowledge repository, wherein the reasoning module uses at least one of: data integration, natural language processing, text mining, confidence thresholds score based algorithms and statistical models for supplementing the one or more defined RDF/XML models.

9. The computer system of claim 1 further comprising an analysis module configured to retrieve and manipulate data, using the programmed microprocessor, related to the one or more defined RDF/XML models using a semantic query language to generate one or more reports.

10. A computer-implemented method for efficiently managing enterprise architecture using resource description framework, via program instructions stored in a memory and executed by a processor, the computer-implemented method comprising:
    defining one or more Resource Description Framework (RDF)/Extensible Markup Language (XML) models corresponding to one or more applications, wherein the one or more RDF/XML models are one or more RDF graph models serialized using XML;
    parsing the one or more defined RDF/XML models to create corresponding Java objects;
    processing the one or more parsed RDF/XML models for creating the corresponding one or more applications, wherein the one or more applications are created by using the created Java objects to facilitate interaction with one or more enterprise relational databases;
    generating one or more graphical user interfaces corresponding to the one or more created applications, wherein the created one or more applications facilitate efficient management of enterprise architecture; and
    evaluating an application from the created one or more applications, wherein the evaluation comprises:
        configuring one or more dimensions associated with the application;
        configuring a first and a second attribute corresponding to each dimension of the one or more dimensions;
        facilitating selection of a first evaluation technique to evaluate the first attribute and a second evaluation technique to evaluate the second attribute, the first evaluation technique is different from the second evaluation technique, wherein the evaluation of the first and the second attribute corresponds to evaluation of the application; and
        generating a score heat map for the application based on the evaluation of the application.

11. The computer-implemented method of claim 10, wherein the one or more RDF/XML models are defined by customizing one or more pre-stored base models and further wherein the one or more pre-stored base models provide one or more templates comprising ontologies required to create the one or more applications.

12. The computer-implemented method of claim 10, wherein the one or more RDF/XML models are parsed using one or more standard RDF parsers to create the corresponding Java objects.

13. The computer-implemented method of claim 10, wherein the one or more applications comprise enterprise situational applications for managing and analyzing enterprise assets.

14. The computer-implemented method of claim 10 wherein the one or more dimensions for evaluating the one or created applications are configured by one or more administrators and further wherein the one or more dimensions comprise technical dimension, financial dimension, functional dimension and strategic dimension.

15. The computer-implemented method of claim 10 further comprising a step of supplementing the one or more defined RDF/XML models with knowledge stored in a knowledge repository, wherein the step of supplementing the one or more defined RDF/XML models comprises using at least one of: data integration, natural language processing, text mining, confidence thresholds score based algorithms and statistical models.

16. The computer-implemented method of claim 10 further comprising a step of retrieving and manipulating data related to the one or more defined RDF/XML models using a semantic query language to generate one or more reports.

17. The method of claim 10, wherein one or more evaluation models, stored as RDF, are utilized to evaluate the application from the created one or more applications.

18. The method of claim 10, wherein the one or more evaluation models are customized by one or more administrators in real time.

19. A computer program product for efficiently managing enterprise architecture using resource description framework, the computer program product comprising:
a non-transitory computer-readable medium having computer-readable program code stored thereon, the computer-readable program code comprising instructions that when executed by a processor, cause the processor to:
define one or more Resource Description Framework (RDF)/Extensible Markup Language (XML) models corresponding to one or more applications, wherein the one or more RDF/XML models are one or more RDF graph models serialized using XML;
parse the one or more defined RDF/XML models to create corresponding Java objects;
process the one or more parsed RDF/XML models for creating the corresponding one or more applications, wherein the one or more applications are created by using the created Java objects to facilitate interaction with one or more enterprise relational databases; and
generate one or more graphical user interfaces corresponding to the one or more created applications, wherein the created one or more applications facilitate efficient management of enterprise architecture; and
evaluate an application from the created one or more applications, wherein the evaluation comprises:
configuration of one or more dimensions associated with the application;
configuration of a first and a second attribute corresponding to each dimension of the one or more dimensions; and
facilitation of selection of a first evaluation technique to evaluate the first attribute and a second evaluation technique to evaluate the second attribute, the first evaluation technique is different from the second evaluation technique, wherein the evaluation of the first and the second attribute corresponds to evaluation of the application; and
generation of a score heat map for the application based on the evaluation of the application.

\* \* \* \* \*